United States Patent [19]

Lewis et al.

[11] 4,198,878
[45] Apr. 22, 1980

[54] ROTARY ENERGY STORAGE DEVICE

[75] Inventors: Armand F. Lewis; Bhagwati P. Gupta, both of Erie, Pa.

[73] Assignee: Lord Corporation, Erie, Pa.

[21] Appl. No.: 838,792

[22] Filed: Oct. 3, 1977

[51] Int. Cl.² ............................................. G05G 1/00
[52] U.S. Cl. ..................................................... 74/572
[58] Field of Search ........................... 74/572; 156/172

[56] References Cited

U.S. PATENT DOCUMENTS

| | | |
|---|---|---|
| 3,296,886 | 1/1967 | Reinhart. |
| 3,602,066 | 8/1971 | Wetherbee. |
| 3,602,067 | 8/1971 | Wetherbee. |
| 3,788,162 | 1/1974 | Rabenhorst et al. |
| 3,964,341 | 6/1976 | Rabenhorst. |
| 3,977,273 | 8/1976 | Ernst et al. ................... 156/172 X |
| 4,000,665 | 1/1977 | Rabenhorst ......................... 74/572 |
| 4,020,714 | 5/1977 | Rabenhorst. |

OTHER PUBLICATIONS

"Proceedings of the 1975 Flywheel Technology Symposium", Lawrence Hall of Science, Berkeley, Calif., Nov. 10-12, 1975, pp. 164-184.

Primary Examiner—Samuel Scott
Assistant Examiner—Wesley S. Ratliff, Jr.
Attorney, Agent, or Firm—Maurice R. Salada; John A. Gazewood

[57] ABSTRACT

A rotary energy storage device includes a core in which a multiplicity of anisotropic filaments are embedded in a resin matrix. Extending through the core is an axis about which the core is rotatable. At least a portion of the filaments in the core are oriented transversely of each other, but not circumferentially of the axis of rotation. The transverse orientation of the filaments relative to each other produces resistance along at least two axes to radial and tangential stresses imposed on the core when it is rotated. The outer peripheral surface of the core is enclosed and snugly fitted by a shell. The shell includes a filamentary structure that provides a plurality of substantially parallel and juxtaposed filament portions oriented to circumscribe the peripheral surface of the core. The filament portions of the shell are encased in a matrix material that bonds adjacent filament portions to one another. The tensile modulus of the filament portions is such that the shell is more resistant to circumferential expansion than is the core. The shell thus impedes, at least, the circumferential expansion of the core in response to centrifugal loads applied to the core during rotation of the energy storage device. As a result, both the ultimate rotational velocity of which the energy storage device is capable and its energy storage capacity may be increased relative to a device in which the core is unconfined.

8 Claims, 6 Drawing Figures

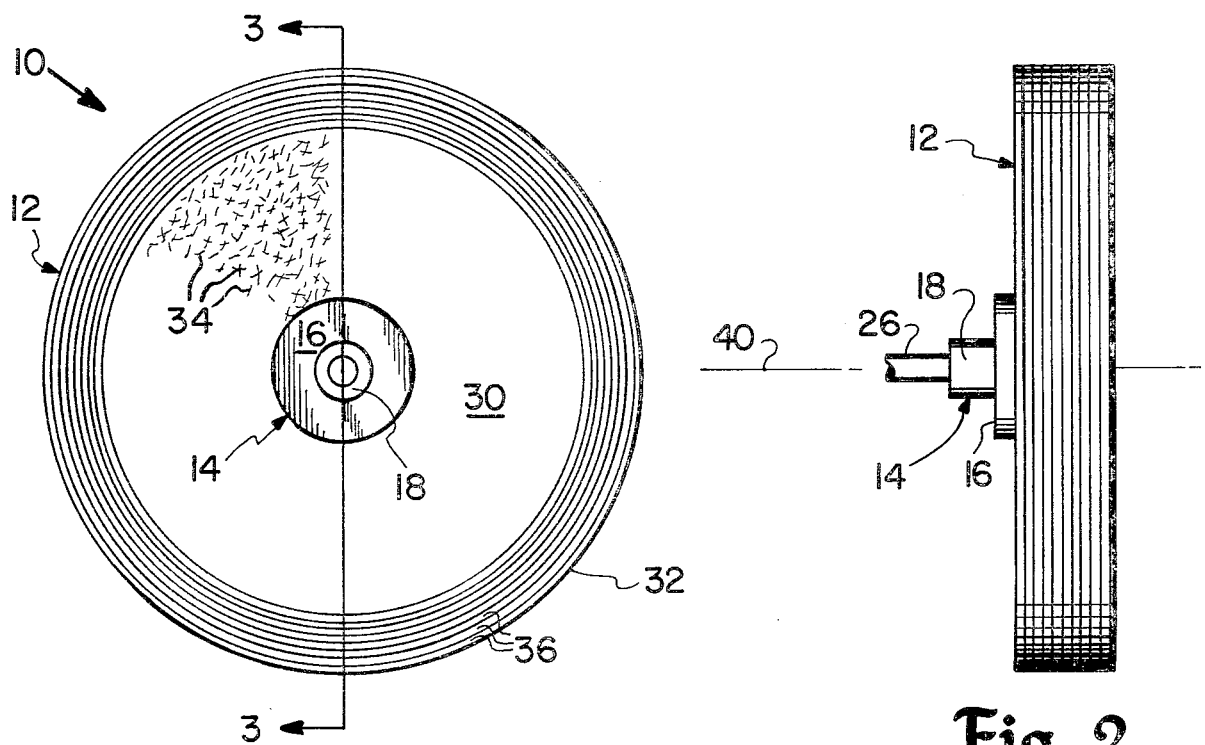
Fig. 1
Fig. 2
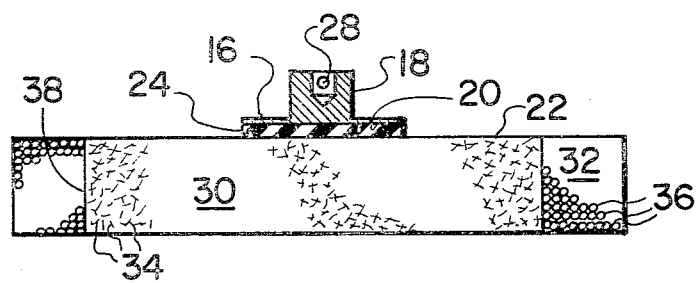
Fig. 3
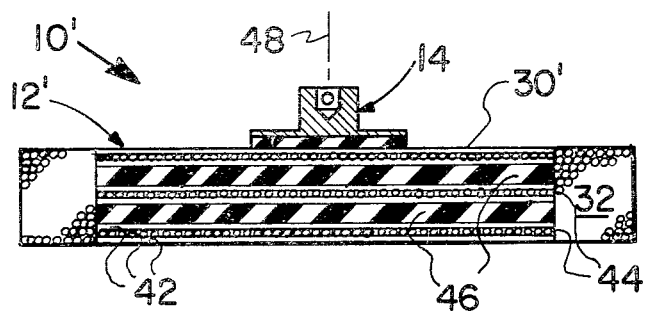
Fig. 4

ROTARY ENERGY STORAGE DEVICE

BACKGROUND OF THE INVENTION

For centuries, rotating masses have been used both to store kinetic energy for future use and to provide a smoother output of energy from installations in which the energy input is intermittent or changes abruptly. In recent years, the production, conservation, and storage of energy obtained from fossil fuels have become problems of global concern. The concern has led to a more concerted effort to evaluate the ultimate potential of rotating masses, particularly flywheels, as energy storage devices. Benefitting the recently intensified interest in rotating masses or flywheels as energy storage devices is the development of new structural materials that offer advantages over materials previously utilized in flywheels. Materials such as glass fibers, carbon fibers, and aramid fibers all have specific strengths, or ratios of strength to density, that are greater than the specific strength of high strength steel, for example. As will be explained, a material that has a high ratio of strength to density offers the possibility of a high energy storage capacity for a flywheel that is fabricated of such a material.

To understand the importance to flywheels of the high specific strengths of recently developed filamentary materials, consideration must be given to the factors that control energy storage capacity. The critical factors can be understood by considering a flywheel of circular shape and uniform thickness throughout which is fabricated of an isotropic material, such as steel. Isotropic materials, which have equal properties (e.g., strength) in all directions, are to be distinguished from anisotropic materials, such as the high strength filamentary materials mentioned above, which have different properties in different directions. The kinetic energy ($E_K$) that is stored in an isotropic rotating flywheel is determined by the following equation:

$$E_K = \tfrac{1}{2} I \omega^2. \tag{1}$$

In equation (1), $\omega$ is the rotational velocity of the flywheel in radians per second and I is the moment of inertia of the flywheel in kilogram-meters squared. The moment of inertia (I) of the disc-shaped flywheel is, in turn, defined by the equation:

$$I = \tfrac{1}{2} m r^2. \tag{2}$$

In equation (2), m is the mass of the flywheel in kilograms, while r is its radius in meters. From equations (1) and (2), it can be seen that the energy stored in a flywheel may be increased by increasing any one of the following factors: mass, radius, and rotational velocity. Since the radius and rotational velocity factors are squared in determining the kinetic energy stored in the flywheel, increasing the radius and/or the rotational velocity of a flywheel is a more efficient and effective method of increasing energy storage capacity than increasing the mass of the flywheel.

The maximum kinetic energy that may be stored in a flywheel is limited by the strength of the material of which the flywheel is fabricated. The strength of the material is used to resist the radial and tangential or circumferential stresses that result from the centrifugal loads imposed on the flywheel as it is rotated. The maximum radial and tangential stresses ($\sigma_r, \sigma_\theta$) in a solid, isotropic flywheel both occur at the center of the flywheel and are equal to each other. The stresses are determined by the following equation:

$$\sigma_r = \sigma_\theta = \tfrac{1}{8} \rho \omega^2 / 386.4 (3+\nu) r^2. \tag{3}$$

In equation (3), $\rho$ is the density of the flywheel material in pounds per cubic inch and $\nu$ is Poisson's ratio for the flywheel material. By comparing equations (1) and (2) with equation (3), it can be seen that the factors that tend to increase the amount of energy stored in a flywheel contribute in the same degree to the radial and tangential stresses in the flywheel. Consequently, the maximum theoretical energy storage capacity of a flat, solid (i.e., no openings), disc-shaped flywheel can only be increased by fabricating the flywheel of a higher strength material. The increase in material strength must be achieved, however, without an increase in density because density is a factor that directly affects the radial and tangential stresses. Thus, a high ratio of strength to density is an important chracteristic of a preferred flywheel material. The specific strength or strength to density ratio is critical regardless of the shape of the flywheel.

Because of the importance of the specific strength of the material of which a flywheel is fabricated, many efforts have been made to incorporate recently developed, high strength, anistropic filamentary materials into flywheels. In one type of flywheel that utilizes anisotropic filamentary materials, the filaments are circumferentially wound about a central hub, and an axis of rotation, to produce a circular flywheel. In another type of filamentary flywheel, the filaments are disposed normal to the axis of rotation of the flywheel. When disposed normal to the axis of rotation, the filaments may be individually secured to a central hub or they may be bonded together in a matrix material to form a solid or continuous member. A third type of filamentary flywheel incorporates short (e.g., chopped) anisotropic filaments randomly dispersed in a resin matrix that is molded to a desired shape. Substantial work in the field of filamentary flywheels has been done by David Rabenhorst of the Applied Physics Laboratory at The Johns Hopkins University. Mr. Rabenhorst is the inventor or coinventor of several patented flywheel designs employing filamentary materials. Mr. Rabenhorst's patented flywheels are described and illustrated in patents such as: Rabenhorst U.S. Pat. No. 3,672,241; Rabenhorst U.S. Pat. No. 3,698,262; Rabenhorst U.S. Pat. No. 3,737,694; Rabenhorst et al U.S. Pat. No. 3,788,162; Rabenhorst U.S. Pat. No. 3,884,093; Rabenhorst U.S. Pat. No. 3,964,341; Rabenhorst U.S. Pat. No. 3,982,447; Rabenhorst U.S. Pat. No. 4,000,665; Rabenhorst U.S. Pat. No. 4,020,714; and Rabenhorst U.S. Pat. No. 4,023,437. Other flywheels or rotary energy storage devices that utilize high strength filaments are described and illustrated in patents such as: Reinhart, Jr. U.S. Pat. No. 3,296,886; Wetherbee, Jr. U.S. Pat. No. 3,602,066; Wetherbee, Jr. U.S. Pat. No. 3,602,067; Post U.S. Pat. No. 3,683,216; Post U.S. Pat. No. 3,741,034; and Post U.S. Pat. No. 3,859,868.

As previously mentioned, the strength, tensile modulus, and other properties of anisotropic, filamentary materials are significantly greater in one direction, typically along the length of the filaments, than in other directions. Consequently, flywheel designs that incorporate anisotropic, filamentary materials attempt to orient the filaments such that they are stressed primarily in the direction of their greatest strength. Ideally, a filamentary flywheel should also be designed such that, at its operating speed, all of the filaments are stressed to or near their ultimate strengths all along their lengths. As a practical matter, however, a flywheel in which all filaments are stressed to their limits is not possible. The closest approximation to such an ideal flywheel is a flywheel that consists primarily of a thin rim of filaments that are wound so as to encircle their axis of rotation at some finite radial distance. The primary stresses imposed on the filaments will be oriented along their lengths and will increase in proportion to the square of the radial distance of the filaments from the axis of rotation. With a sufficiently thin rim, the variation in stresses from the inner circumference of the rim to the outer circumference of the rim can be minimized. Although a thin rim flywheel is very efficient in terms of energy density or energy stored per unit weight, the flywheel is equally inefficient when viewed in terms of energy stored per unit of volume enclosed or swept out by the flywheel as it rotates.

To provide flywheels that are more efficient, from a volumetric standpoint, than the thin rim, wound filament flywheel, some researchers have turned to filling in the volume between a thin rim and its axis of rotation. The usual approach to "filling in" a thin rim flywheel is to provide additional windings of filaments that are disposed closer to the axis of rotation than the rim. If all of the filamentary windings are fabricated of the same material, the windings closer to the axis of rotation are less heavily stressed and contribute less to the energy storage capacity of the flywheel than the filaments adjacent the outer circumference of the flywheel. More importantly, however, since strain is proportional to stress, the radially outermost circumferential filaments expand or stretch more than the inner circumferential filaments and cause the flywheel to break into many concentric rings long before any of the filaments reach their breaking stress. To overcome the problem of having a wound filamentary flywheel break into concentric rings, it has been proposed to increase the modulus of elasticity of such a wound flywheel with increasing radial distance from the axis of rotation. Thus, although the filaments located closer to the axis of rotation will not be as highly stressed as the filaments closer to the outer circumference of the flywheel, the radially inner filaments will expand or stretch more easily and under less load than the radially outer filaments and will be able to keep pace with the outward expansion of the outermost filaments. Flywheels that incorporate such a principle are described and illustrated in Reinhart, Jr. U.S. Pat. No. 3,296,886, Wetherbee, Jr. U.S. Pat. No. 3,602,066, and Wetherbee, Jr. U.S. Pat. No. 3,602,067. More recently, it has been proposed, in Rabenhorst U.S. Pat. Nos. 3,964,341 and 4,020,714, to tie together adjacent filaments or groups of filaments at discrete and separate points about the circumference of a wound filament flywheel. Between the tie points, the filaments are free to stretch at any rate determined by the rotational speed of the flywheel and the radial position of the filaments.

Efforts to improve the volumetric efficiency of filamentary flywheels, in comparison to thin rim, wound flywheels, have also included the design of flywheels in which the filaments are oriented other than circumferentially of the axis of rotation. As shown in Rabenhorst et al U.S. Pat. No. 3,788,162, a filamentary flywheel may be fabricated of a plurality of parallel plies or plates of parallel, anisotropic filaments embedded in a resin matrix. The plies are bonded together to form a disc-shaped rotor that rotates about an axis disposed perpendicular to the plies of filamentary material. In such a flywheel, anisotropic filaments that pass through or close to the axis of rotation will be stressed primarily along their lengths and will experience maximum stresses at their longitudinal centers. Filaments that do not pass through or close to the axis of rotation, however, will not be as highly stressed along their lengths and will also be subject to unbalanced radial and tangential loads that will tend to force the filaments out of the resin matrix and the flywheel. Another flywheel construction shown in the Rabenhorst et al patent is the use of short filaments randomly dispersed in a resin matrix. Because of their random orientation, very few of the filaments are correctly oriented so as to be stressed to their maximum or ultimate strengths. Nonetheless, such as flywheel is inexpensive to fabricate, in comparison to wound filament flywheels and flywheels fabricated of laminated sheets or plies. It also offers reasonably good volumetric efficiencies. In terms of its efficiency per unit weight, a flywheel fabricated of randomly oriented filaments may offer energy storage capacities on the order of two to ten watt-hours per pound.

SUMMARY OF THE INVENTION

The present invention is directed to a rotary energy storage device in which hoop or circumferential windings of anisotropic filaments are utilized to improve the performance characteristics of a radially inner core fabricated of filamentary materials that are oriented to provide isotropic or quasi-isotropic properties for the core. Ideally, the core will be relatively inexpensive to fabricate and the hoop windings of filamentary material will improve the performance characteristics of the total flywheel without adding appreciably to the cost of the flywheel. A rotary energy storage device according to the present invention comprises a core that includes a multiplicity of anisotropic filaments embedded in a resin matrix. Extending through the core is an axis which is circumscribed by an outer periphery of the core and about which the core is rotatable. At least a portion of the multiplicity of anisotropic filaments in the core are oriented transversely of each other and in directions other than circumferentially of the axis of rotation. The transversely oriented filaments will produce, in response to radial and tangential stresses imposed on the core when it is rotated, a resistance to stress that is greater than the stress resistance of which the resin matrix would be capable. The improved stress resistance capability or strength will be available to an approximately equal degree along each of at least two axes that are oriented transversely of each other and generally parallel to transversely oriented filaments in the core. Snugly fitting and enclosing at least a circumferential portion of the circumferential surface defined by the periphery of the core is a shell fabricated of filamentary materials. The shell includes a filamentary structure that provides a plurality of substantially parallel and juxtaposed filament portions oriented to circumscribe the circumferential surface of the core. The filament portions are encased in a matrix material that bonds adjacent filament portions to one another. The tensile modulus of the filament portions is such that the shell is more resistant to circumferential expansion than is the core. The shell thus impedes, at least, the circumferential expansion of the core in response to centrifugal loads applied to the core due to rotation of the energy storage device. As a result, the ultimate rotational velocity and the ultimate energy storage capacity of which the energy storage device is capable may be increased relative to a similar storage device in which the core is not confined by a shell.

In one embodiment of the invention, the filaments of the core are randomly oriented within the resin matrix of the core. The core may thus be manufactured inexpensively, and the application of the filamentary shell will have a dramatic influence on the energy storage capacity of the total flywheel per unit weight. In another embodiment of the invention, the core includes at least one plate-like ply of anisotropic filaments embedded in a resin matrix with the filaments of each ply being formed into a plurality of filamentary strands of at least one filament each. The strands of each ply are all oriented parallel to one another. Several such plies may be stacked up and bonded together, each with its constituent filaments oriented at an angle to the filaments of an adjacent ply, to provide the required multidirectional resistance to stresses. The filamentary shell, when applied to such a core, may not provide a dramatic increase in energy storage capacity, but may provide additional restraint against radial movement of filaments that lie adjacent and generally parallel to the peripheries of the plate-like plies. The restraining capabilities of the filamentary shell will also be of value in an energy storage device in which the core includes at least two of said plate-like plies separated by and bonded to a layer of elastomeric material. Such a flywheel construction has been proposed in copending, commonly assigned, application Ser. No. 807,622, filed June 17, 1977, with a view to providing improved vibration damping and stress distribution within a flywheel structure. Since the elastomeric interlayer between the plate-like plies will have a significantly lower modulus of elasticity than the plies, outward migration of the elastomeric material at high rotational speeds might reasonably be expected. The filamentary shell will tend to restrain such migration and preserve the integrity of the energy storage device.

BRIEF DESCRIPTION OF THE DRAWINGS

For a better understanding of the invention, reference may be made to the following description of two exemplary embodiments, taken in conjunction with the figures of the accompanying drawings, in which:

FIG. 1 is a plan view of a rotary energy storage device according to the present invention;

FIG. 2 is a side view of the rotary energy storage device of FIG. 1;

FIG. 3 is a sectional view of the rotary energy storage device of FIG. 1, taken along line 3—3 of FIG. 1;

FIG. 4 is a sectional view, corresponding to the view shown in FIG. 3, of another embodiment of a rotary energy storage device according to the present invention;

DESCRIPTION OF EMBODIMENTS

Figure 5:
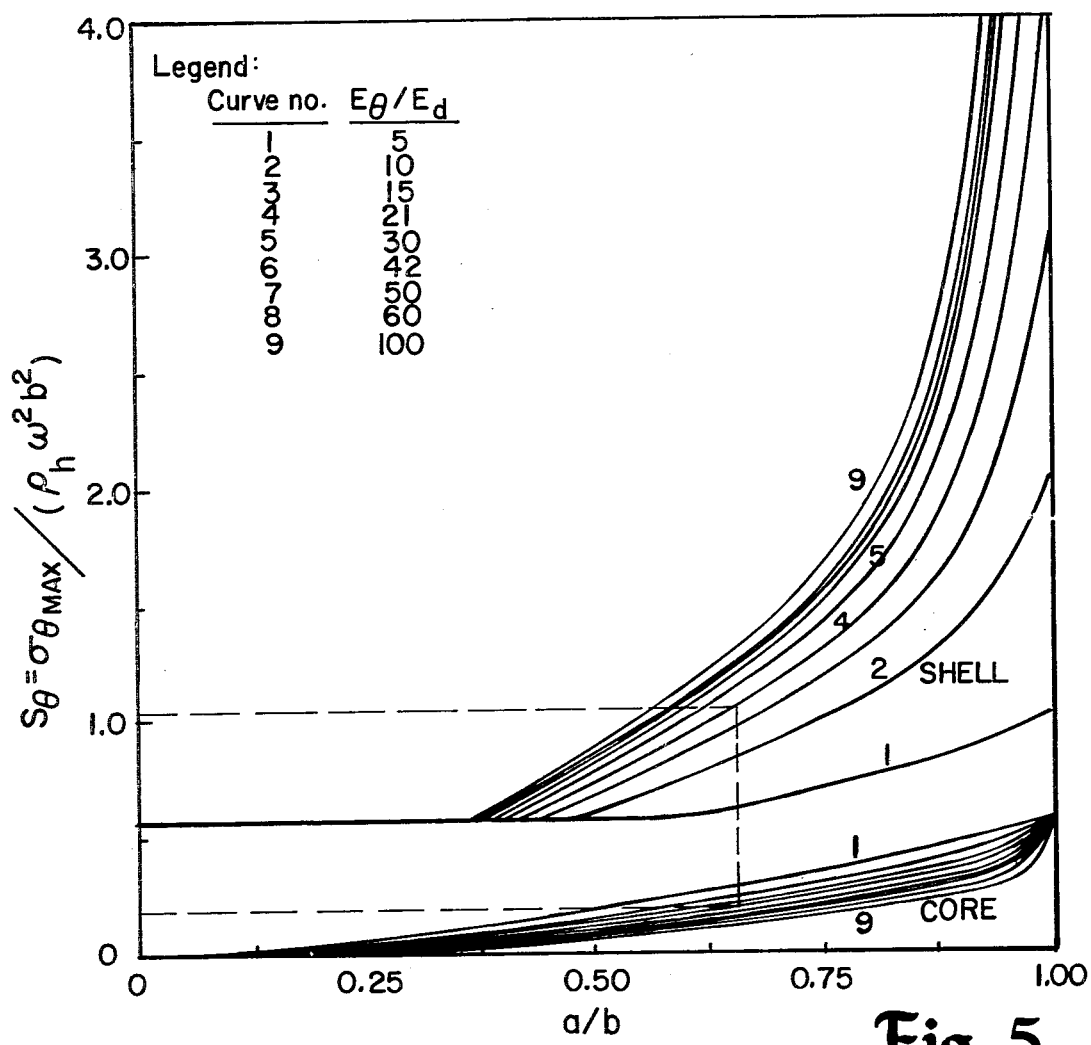
FIG. 5 is a graphical design aid for designing a rotary energy storage device such as is shown in FIGS. 1–3.

FIG. 1 of the drawings illustrates, in plan view, a rotary energy storage device 10. The energy storage device 10 includes a disc-like rotor element 12 and a smaller diameter hub 14. As best shown in FIGS. 2 and 3, the hub 14 includes a circular flange portion 16 and a tubular socket portion 18 that extends from the center of one side of the flange portion. The side of the flange portion 16 opposite the tubular socket portion 18 affords a flat, circular mounting surface 20 that is presented to but spaced from a parallel and opposed surface 22 of the rotor 12. Disposed between and bonded to the two surfaces 20 and 22 is a resilient interlayer 24 formed of an elastomeric material, for example. The interlayer 24 thus joins the hub 14 to the rotor 12. To permit a rotational input to be transmitted to and from the rotor 12, the socket portion 18 of the hub 14 receives an elongated rotatable shaft 26. The shaft 26 is held in place in the socket portion 18 by a pin (not shown) that fits into a hole 28 formed transversely through the socket portion and into an aligned hole formed in the shaft 26.

The hub 14 is fabricated of a homogeneous, isotropic material such as steel or aluminum. The rotor 12, on the other hand, is fabricated of anisotropic fibers or filaments embedded in a resin matrix. Although the rotor 12 is fabricated entirely of filaments embedded in a matrix, the structure of the rotor is such that it is effectively divided into a central disc-like core 30 and an outer, annular rim or shell 32. In the core 30, short (e.g., chopped) anisotropic filaments or fibers 34 are randomly dispersed in a resin matrix. Along their lengths, the filaments 34 have a higher strength or capacity for resisting stress than does the resin matrix. The filaments 34 thus reinforce the resin. Since the filaments 34 are oriented transversely of each other, the high strength of the filaments is effective to reinforce the resin along a multiplicity of axes that are parallel to the various filaments. Because there is no need to align the filaments 34, the material of which the core 30 is fabricated can be inexpensively manufactured. The core 30 itself can be inexpensively molded to any desired shape and, if necessary, subsequently machined to attain a desired degree of rotational balance. In the shell or rim 32, on the other hand, the anisotropic filaments must be carefully oriented so that the shell 32 will provide a filamentary structure in which a multiplicity of substantially parallel and juxtaposed filament portions circumscribe the annular circumferential surface 38 of the core 30. The filamentary structure preferably results from winding one or more strands 36 of fibrous or filamentous material about the core 30. Each filamentary strand 36 that is incorporated into the shell 32 is formed of at least one distinct anisotropic fiber or filament. In a multiple filament strand, the filaments are oriented to extend generally lengthwise of the strand, although the filaments may be twisted or otherwise oriented to help maintain the integrity of the strand. The desired parallel and juxtaposed filament portions will be provided by adjacent portions of distinct filaments and by any adjacent turns of an individual filament. If the shell 32 includes a strand formed of a single filament, the adjacent turns of the filament will define the parallel and juxtaposed filament portions.

Provided the shell 32 is more resistant to circumferential expansion than is the core 30, so as to impede circumferential expansion of the core, the filaments 34 and the filamentary strands 36 may be fabricated of any filamentary material, while the matrices for the filaments 34 and filamentary strands 36 may be fabricated of any matrix material compatible with the filamentary material. Suitable high strength filamentary materials include graphite fibers, boron filaments, glass fibers, ceramic fibers, metallic fibers, and aramid fibers such as the fibers marketed under the trademark Kevlar ® by E. I. du Pont de Nemours & Company. Lower strength anisotropic fibers, such as cellulose fibers, may also be used, especially in the core 30, where it is desired to reduce the cost of fabrication still further or where higher strength is unnecessary. Suitable matrix materials include epoxy resins, phenolics, polyimides, polyesters, acrylics, polystyrene, ABS, and polycarbonate. The most effective method of insuring that the shell 32 will be more resistant to circumferential expansion than will the core 30 is to utilize filaments in the shell which have significantly higher tensile moduli than the elastic modulus of the core material. Although the core 30 includes chopped fibers 34 that have one modulus and a matrix material that has a different modulus, the homogeneous dispersion and random arrangement of the filaments 34 in the resin matrix make it permissible for the core to be treated as though it were formed of an isotropic material with a uniform modulus of elasticity. The core thus can be said to have a nominally uniform modulus of elasticity throughout and is approximately isotropic or "quasi-isotropic" in character, particularly with respect to its strength. In the shell 32, on the other hand, the nature and orientation of the filament strands 36 will cause the anisotropic properties of the filaments to dominate the characteristics of the shell. Thus, while the matrix material within the shell 32 may effectively reduce the tangential and radial moduli of the shell 32 in comparison to the tensile and transverse moduli of the filaments in the strands 36, the shell 32 is still regarded as an orthotropic or anisotropic structure.

In operation of the energy storage device 10, the shaft 26 is rotated about its longitudinal axis 40 by a conventional drive unit (not shown). The rotation of the shaft is transmitted through the hub 14 and the interlayer 24 to the rotor 12. It is expected that the rotor 12 will normally turn at rotational speeds in the range of 5,000 to 60,000 or more revolutions per minute(rpm). At such rotational speeds, the difference between the diameter of the core 30, at least, of the rotor 12 and the diameter of the hub 14 will probably result in a larger strain being imposed on the core 30 as compared to the strain on the hub 14. The difference in strains, which can be visualized as a difference between the radial expansion of the rotor 12 and the radial expansion of the hub 14 due to centrifugal loads, is accommodated by deflection of the elastomeric interlayer 24, as explained in commonly owned, copending application Ser. No. 774,578, filed Mar. 4, 1977. The use of an elastomeric interlayer to couple the hub 14 to the rotor 12 is preferable to bonding the hub to the rotor using only a layer of adhesive. A layer of adhesive may not be able to accommodate the strain differential that will probably occur in the energy storage device 10 at high rotational speeds.

As previously discussed, the maximum strain experienced by the energy storage device 10 will increase in proportion to the square of the rotational speed of the device. For the core 30, which may be regarded as being formed of an isotropic material, the radial and tangential or circumferential stresses that result from the centrifugal loads imposed on the energy storage device 10 both reach a maximum at the center of the core and are equal to each other. When the maximum stresses in the core 30 exceed the tensile strength of the material of which the core 30 is formed, the core will disintegrate. Because of the random orientation of the filaments 34 and their short length compared to the diameter of the core 30, the strength of the core material is only a fraction of the strength of the individual filaments 34. Thus, the core 30, by itself, cannot be rotated to exceptionally high rotational speeds, nor can it provide very high energy storage capacities. The shell 32, however, provides additional resistance to circumferential or radial expansion of the core 30. By containing or impeding the circumferential expansion or strain experienced by the core 30, the shell 32 also reduces the stresses experienced within the core. The core and shell combination can thus be rotated to much higher speeds and have a much higher energy storage capacity per unit weight and volume than an equivalently sized core by itself. As an example, for which details will be given hereinafter, the maximum safe speed at which one can rotate a rotor which is eleven inches (11") in radius and one inch (1") in thickness and which is fabricated of 30% chopped glass fiber filled polycarbonate is approximately 14,000 rpm. At maximum rotational speed, the rotor is capable of storing energy at a level of approximately 5 watt-hrs./lb. If, on the other hand, the radius of the chopped glass filled material is reduced to about seven and one-quarter inches (7¼") and the remaining three and three quarters inches (3¾") of the radius of the rotor are occupied by a shell fabricated of graphite fibers embedded in an epoxy resin matrix, the composite rotor can achieve a rotational speed of about 25,000 rpm and an energy storage capacity of about 16 watt-hrs./lb.

The benefits afforded by the shell 32 in the energy storage device 10 of FIGS. 1 to 3 can perhaps be best understood by considering the following mathematical analysis of the device. According to the analysis, the radial and tangential stresses ($\sigma_r$, $\sigma\theta$) and the radial displacement (u) experienced in the core at any radius (r) from the axis of rotation are:

$$\sigma_r = -p + \frac{(3 + v_d)}{8} \rho_d \omega^2 (a^2 - r^2) \quad (4)$$

$$\sigma_\theta = -p + \frac{(3 + v_d)}{8} \rho_d \omega^2 [a^2 - \frac{(1 + 3 v_d)}{(3 + v_d)} r^2] \quad (5)$$

$$u = \frac{-p(1 - v_d)}{E_d} + \frac{(1 - v_d)}{8 E_d} \rho_d \omega^2 r [(3 + v_d)a^2 - (1 + v_d)r^2] \quad (6)$$

In equations (4), (5), and (6), p is the pressure exerted by the shell 32 on the core 30, $v_d$ is Poisson's ratio for the core material, $\rho_d$ is the mass density of the core material, $\omega$ is the rotational velocity of the energy storage device 10, a is the radius of the core, and $E_d$ is the modulus of the core material. For the shell 32, the corresponding stresses and displacement at any radius (r) are:

$$\sigma_r = \rho_h \omega^2 b^2 \frac{(3 + v_\theta)}{(9 - K^2)} [\frac{1 - C^{K+3}}{1 - C^{2K}} (\frac{r}{b})^{K-1} + \frac{1 - C^{K-3}}{1 - C^{2K}} C^{K+3}(\frac{b}{r})^{K+1} - (\frac{r}{b})^2] + \frac{pC^{K+1}}{1 - C^{2K}} [(\frac{r}{b})^{K-1} - (\frac{b}{r})^{K+1}] \quad (7)$$

$$\sigma_\theta = \frac{\rho_h\omega^2 b^2}{(9-K^2)} \Bigg\{ (3+\nu_\theta)K[\frac{1-C^{K+1}}{1-C^{2K}}(\frac{r}{b})^{K-1} - \frac{1-C^{K-3}}{1-C^{2K}}C^{K+3}(\frac{b}{r})^{K+1}] \qquad (8)$$

$$- (K^2 + 3\nu_\theta)(\frac{r}{b})^2 \Bigg\} + \frac{pC^{K+1}}{1-C^{2K}}K[(\frac{r}{b})^{K-1} + (\frac{b}{r})^{K+1}]$$

$$u = \frac{\rho_h\omega^2 b^3}{E_\theta(9-K^2)} \Bigg\{ (3+\nu_\theta)[(K-\nu_\theta)\frac{1-C^{K+3}}{1-C^{2K}}(\frac{r}{b})^K - (K+\nu_\theta)(\frac{1-C^{K-3}}{1-C^{2K}})C^{K+3} \qquad (9)$$

$$\cdot(\frac{b}{r})^K] - (K^2-\nu_\theta^2)(\frac{r}{b})^3 \Bigg\} +$$

$$\frac{pbC^{K+1}}{E_\theta(1-C^{2K})}[(K-\nu_\theta)(\frac{r}{b})^K + (K+\nu_\theta)(\frac{b}{r})^K]$$

In equations (7), (8), and (9), $\nu_h$ is Poisson's ratio for the shell, $\rho_h$ is the mass density of the shell material, b is the outer radius of the shell and the energy storage device, K is the square root of the quotient of the tangential or circumferential modulus ($E_\theta$) of the shell divided by the radial modulus ($E_r$) of the shell, and C is the quotient of a divided by b. By imposing the boundary condition that u in the core, when r=a, must equal u in the shell, when r=a, equations (6) and (9) may be solved together to obtain an equation that defines p. Using a computer, all of equations (4) through (9), plus the equation for p, may be manipulated to provide the design graphs that appear as FIGS. 5 and 6.

Figure 6:
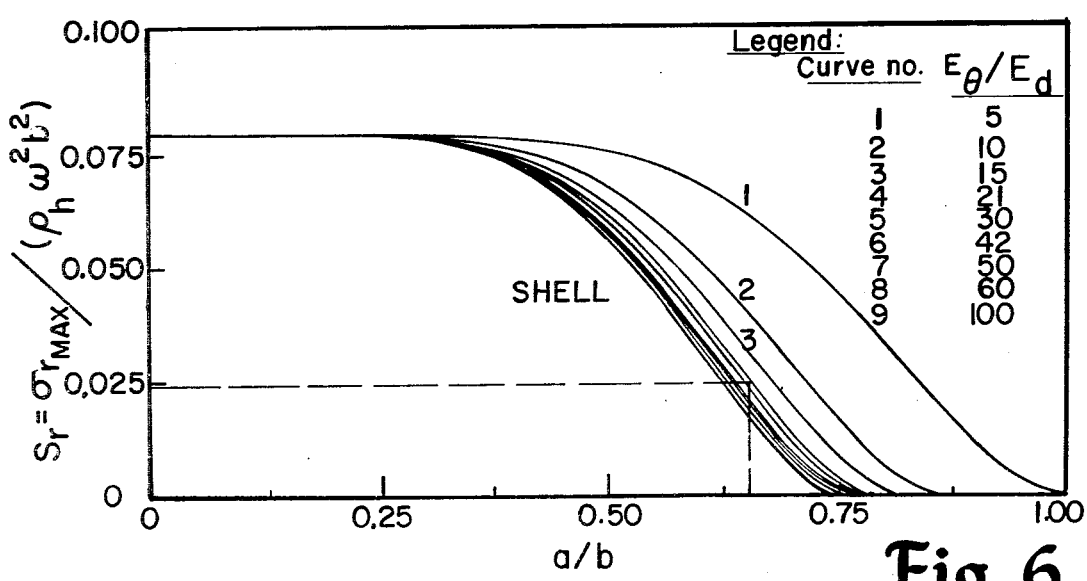
FIG. 6 is another graphical design aid, complementary to FIG. 5, for designing a rotary energy storage device such as is shown in FIGS. 1–3.

Returning to the example of a core fabricated of 30% chopped glass fiber filled polycarbonate, the known material properties are: $E_d=0.95\times10^6$ psi; ultimate strength $(\sigma_u)=20,000$ psi, density=0.0686 lb./in.$^3$; and $\nu_d=0.4$. Assuming the absence of a shell and radius a=b=eleven inches (11"), equations (4) and (5) give a maximum rotational speed at ultimate strength of about 14,000 revolutions per minute. Such a rotational speed will offer an energy storage capacity of about 5 watt-hours per pound. Suppose, however, that it is desirable to be able to rotate an energy storage device fabricated to include such a core at a speed of 25,000 revolutions per minute, thereby providing an energy storage capacity of about 16 watt-hours per pound. FIGS. 5 and 6 can be utilized to advantage to design a core-and-shell combination capable of attaining the desired rotational speed. A graphite fiber-epoxy composite is selected as a likely candidate for the shell material. The tensile modulus of the graphite fiber-epoxy material is about $21\times10^6$ psi, the density is 0.055 lb./in.$^3$, the ultimate tensile strength is 180,000 psi, and the ultimate radial strength is 6,000 psi. If $\sigma_r$ and $\sigma_\theta$ in the core are to reach the ultimate strength of the core material at 25,000 rpm, $S_\theta$ (a dimensionless factor used in FIG. 5) for the core is 0.169. Noting that $E_\theta/E_d=21\times10^6$ psi/$0.95\times10^6$ psi$\cong22$, and attempting to minimize the shell thickness (b−a), the a/b factor should be selected at the point where a line (dashed) drawn parallel to the x-axis at $S_\theta=0.169$ intersects the $E_\theta/E_d=22$ curve for the core. Reading up from where the $S_\theta=0.169$ line intersects the $E_\theta/E_d=22$ curve for the core to the corresponding $E_\theta/E_d$ curve for the shell, it can be seen that $S_\theta$ for the shell must be at least 1.03. For a rotational speed of 25,000 revolutions per minute, the ultimate tensile strength of the shell must be at least 122,000 psi. Since the ultimate tensile strength of the graphite epoxy material is 180,000 psi, the proposed energy storage device should be able to achieve 25,000 revolutions per minute, provided the ultimate radial strength of the shell is not exceeded. Using the established a/b ratio as the starting point, a check with FIG. 6 shows that a minimum radial strength of about 3000 psi is required—far less than the ultimate radial strength of the shell. The core-and-shell energy storage device capable of rotating at 25,000 rpm will thus have a core of about seven and one-quarter inches radius and a shell of about three and three-quarters inches in radial thickness.(It should be noted that the dimensions given are approximate in part because FIGS. 5 and 6 are based on an assumed $\rho_d/\rho_h=1.37$. Variations in this ratio will have a small, linearly and directly proportional effect on values of $S_\theta$ and the stresses computed for the core and the shell.) Ideally, for the most efficient use of materials, the shell material should be selected so that the core and the shell will fail or reach their ultimate strengths at approximately the same rotational speed. In practice, however, such a result may be difficult to achieve with available materials.

Although the present invention is preferably to be embodied as shown in FIGS. 1 through 3, the use of a shell such as shell 32 can provide some benefits, albeit less striking, when utilized together with cores that do not employ chopped filaments 34. The only requirement to be imposed on all cores used with a shell according to the invention is that the cores either be isotropic in character or approximately so. Metals, such as steel and aluminum, and unfilled (e.g., fiberless) resins are examples of homogeneous, isotropic materials of which an isotropic core might be formed. Nonetheless, metals, particularly steel, are not especially desirable for use in a core according to the present invention because of their high densities. A core made of a metal could not offer a relatively high energy storage capacity per unit weight despite the application of a shell as described above. Other potential core materials include fiber-reinforced resins or fiber-resin composites which do not incorporate short or chopped filaments. The fiber or filamentary reinforcement for a resin could be in the form of a mat of relatively long filaments randomly oriented and intertwined. Filaments or strands of filaments might be woven to form a cloth or fabric reinforcement for a resin material. Alternatively, the filaments or strands of filaments might be arranged in a generally parallel array in resin matrix. If all of the filaments in a core were arranged generally parallel to each other, however, the core would not have isotropic properties, but rather orthotropic properties. Thus, in a core that incorporates filaments or strands of filaments arranged in parallel arrays, the filaments and the resin matrix are formed into a plurality of thin plies in which all of the filaments are oriented parallel to one another. The plies are stacked up and bonded together so that the filaments in each ply are disposed at an angle to the filaments of at least one adjacent ply. The laminated core thus has the benefit, in more than one direction or along more than one axis, of the anisotropic high strength, for example, of the filaments that are incorporated in the plies. Such a laminated core is not purely anisotropic or orthotropic in character and can be regarded as approximately isotropic or "quasi-isotropic". A flywheel rotor without any shell but fabricated of a plurality of plies of parallel filaments embedded in a resin matrix, generally as described above, is shown in FIG. 2 of Rabenhorst et al U.S. Pat. No. 3,788,162. A quasi-isotropic, laminated core might also be fabricated of plywood, for example.

As a specific example of a core that does not incorporate short fibers, FIG. 4 illustrates a rotary energy storage device 10' that includes a rotor 12' fabricated of a shell 32 and a core 30'. The shell 32 is substantially identical to the shell 32 of FIGS. 1–3 and may be fabricated utilizing similar materials and fabrication methods. The core 30', on the other hand, includes nine plate-like plies 42 fabricated of parallel strands of anisotropic high strength fibers or filaments embedded in a resin matrix. The plies 42 are arranged in three groups of three plies each and the plies in each group of three are bonded together to form a laminated plate 44. Each of the plates 44 is a continuous member within its outer circumference and is free of holes or other openings. The filamentary strands within the plates 44 may be fabricated of generally the same materials as the strands 36 in the shell 32. Each of the filamentary strands extends across the rotor 12' and is oriented transversely of the central axis 48 of the rotor and the energy storage device 10'. The strands of each ply 42 within each plate 44 are also oriented transversely of the strands in at least one adjacent ply so as to provide quasi-isotropic properties for the plate. Interposed between and secured to the three layers or plates 44 are two layers of a viscoelastic material 46, such as an elastomer. The elastomer utilized in the layers 46 may be natural rubber or any other synthetic elastomer, such as liquid catalyst curable polyurethanes, polybutadiene elastomers, and thermoplastic elastomers. Typically, the elastomeric layers 46 will be secured to adjacent plates 44 and plies 42 by an adhesive, such as one of the Chemlok ® adhesives manufactured by the Hughson Chemicals division of Lord Corporation, Erie, Pennsylvania. Nonetheless, some elastomeric materials may form acceptable bonds without an adhesive. Although the elastomer may be reinforced, it is a homogeneous, isotropic material in the embodiment of FIG. 4.

As is more fully described and discussed in copending, commonly assigned U.S. application Ser. No. 807,622, filed June 17, 1977, the structural arrangement of the core 30' of the rotor 12' is intended to provide improved vibration damping and stress distribution as compared to a similar laminated structure without elastomeric layers. It is anticipated that at high rotational speeds, short filamentary strands which lie almost entirely along the periphery of the laminated core 30' might be forced from the core structure well prior to the theoretical maximum rotational speed of the core. Similarly, the elastomeric layers 46, which will have a much lower modulus of elasticity than the plies 42, particularly in directions parallel to the lengths of the filamentary strands, may also tend to migrate radially outward as the rotational speed of the energy storage device 10' is increased. The shell 32 may, in such cases, help to prevent the outward migration of the elastomer and the pulling away of short filaments or filamentary strands from the plies 42 and the plates 44. It is also possible that the employment of the shell 32 may increase the ultimate rotational speed of the energy storage device 10', as compared to a similar device without a shell 32.

As should be apparent from the foregoing discussion and a consideration of FIG. 5, the present invention is most useful when the difference between the tangential or circumferential modulus ($E_\theta$) of the shell and the modulus of elasticity ($E_d$) of the core is significant but not excessive. Thus, for example, as the ratio between the two moduli drops below 5, the increase in energy storage capacity of a rotor constructed according to the present invention, as compared to a rotor similarly fabricated but without a shell, is not particularly great. At the same time, as the ratio between the two moduli increases above 100, the contribution of the core material to the energy storage capacity of the rotor is marginal, as compared to the energy storage capacity of the shell. In a similar manner, the present invention is most useful when the ratio a/b is at least about 0.375 or about 3:8. As can be seen from FIG. 5, when the mass density ($\rho_h$) and the outer radius (b) of the shell and the rotational speed ($\omega$) of a rotor constructed according to the present invention are all fixed, the maximum circumferential or tangential stress ($\sigma_\theta$) in the shell remains constant for all ratios of a/b less than about 0.375, regardless of the $E_\theta/E_d$ ratio. Consequently, if the ratio of radii or diameters a/b is less than 0.375, the inner windings of relatively expensive, anisotropic filaments in the shell are being incorporated in the rotor unnecessarily. The expensive filaments could be replaced with less expensive material, such as chopped fibers randomly dispersed in a resin matrix, without adding to the stress in the shell.

Although the embodiments of the present invention illustrated in FIGS. 1 through 3 and FIG. 4 utilize an elastomeric interlayer 24 to attach the rotors 12 and 12' to the hubs 14, other attachment mechanisms are possible. The hubs 14 might, for example, be bonded directly to the adjacent surfaces of the rotors 12 and 12'. Alternatively, rods, pins, or bolts that extend through a rotor 12 or 12' might be used. If an attachment mechanism pierces the rotor, however, the resulting hole or holes through the rotor will affect the analysis of the core, for example, in which the hole or holes exist. More particularly, the graphical design aids of FIGS. 5 and 6 can not be utilized to design a core-shell energy storage device if there is to be a hole in the core for attaching the rotor to a hub.

It will be understood that the embodiments described above are merely exemplary and that persons skilled in the art may make many variations and modifications without departing from the spirit and scope of the invention. All such modifications and variations are intended to be within the scope of the invention as defined in the appended claims.

What is claimed is:

1. A rotary energy-storage device comprising:
   (a) a core that is free of any opening through it and includes a multiplicity of anisotropic elements embedded in a resin matrix; the core being rotatable about an axis passing through said core, and having an outer periphery that circumscribes the axis of rotation; at least a portion of said multiplicity of anisotropic filaments being oriented (i) other than circumferentially of the axis of rotation and (ii) transversely of each other so as to produce, to an approximately equal degree along each of at least two axes that are oriented transversely of each other and parallel to at least some of said transversely oriented filaments, resistance to radial and tangential stresses imposed on the core when it is rotated about the axis of rotation, said stress resistance produced by said transversely oriented filaments being greater than a corresponding stress resistance offered by the resin matrix along; and (b) shell means for enclosing and snugly fitting the circumferential surface defined by the outer periphery of the core; the shell means including (i) filamentary means providing a plurality of substantially parallel and juxtaposed filament portions oriented to circumscribe the circumferential surface of the core, and (ii) matrix means encasing the filament portions of the filamentary means and bonding adjacent filament portions to one another; the filamentary means having a tensile modulus such that the shell means is more resistant to circumferential expansion than the core so as to impede circumferential expansion of the core in response to centrifugal loads applied on the core due to rotation of the energy-storage device about said axis of rotation; said core and said shell means each having an outer diameter measured generally normal to the axis of rotation, the ratio of the outer diameter of the core to the outer diameter of the shell means being at least 3:8.

2. An energy storage device, according to claim 1, wherein the filamentary means includes a single continuous filament strand wound in a plurality of turns around the circumferential surface defined by the periphery of the core, the filament portions of the filamentary means including adjacent turns of the filament strand.

3. An energy storage device, according to claim 1, wherein the core includes at least one plate-like ply of anisotropic filaments embedded in a resin matrix, the filaments of said ply being formed into a plurality of filamentary strands of at least one filament each, the strands of each ply all being oriented parallel to one another.

4. An energy storage device, according to claim 3, wherein the core includes:

(a) a plurality of said plate-like plies fabricated of anisotropic filaments embedded in a resin matrix; and (b) a layer of elastomeric material interposed between and secured to at least two of said plies, said plurality of plies being disposed relative to each other such that at least some of the anisotropic filaments in the plies are oriented transversely of each other so as to produce resistance along at least two axes to radial and tangential stresses imposed on the energy storage device when rotated about the axis of rotation.

5. An energy storage device, according to claim 1, wherein the filaments of the core are randomly oriented within the core.

6. An energy-storage device, according to claim 1, wherein the core has a nominally uniform modulus of elasticity throughout, wherein the shell has nominally uniform tensile modulus in directions that are circumferential relative to the axis of rotation, and wherein the ratio of the circumferential tensile modulus of the shell to the modulus of elasticity of the core fails in the range from 5:1 to 100:1.

7. A rotary energy-storage device comprising:

(a) a core which is rotatable about an axis that passes through said core and which has an outer periphery that circumscribes the axis of rotation; at least a part of the core being fabricated such that it is capable of offering resistance in an approximately equal amount along substantially any axis to radial and tangential stresses imposed on the core when it is rotated about the axis of rotation; the core also being free of any opening through it; and (b) shell means for enclosing and snugly fitting the circumferential surface defined by the outer periphery of the core, the shell means including (i) filamentary means providing a plurality of substantially parallel and juxtaposed filament portions oriented to circumscribe the circumferential surface of the core, and (ii) matrix means encasing the filament portions of the filamentary means and bonding adjacent filament portions to one another, the filamentary means having a tensile modulus such that the shell means is more resistant to circumferential expansion than the core so as to impede circumferential expansion of the core in response to centrifugal loads applied on the core due to rotation of the energy storage device about said axis of rotation; said core and said shell means each having an outer diameter measured in a common plane transverse to the axis of rotation, the ratio of the outer diameter of the core to the outer diameter of the shell means being at least 3:8.

8. An energy storage device, according to claim 7, wherein substantially all of the core is fabricated of a multiplicity of anisotropic filaments embedded and randomly oriented within a resin matrix.

* * * * *